United States Patent [19]
Firstenberg

[11] 3,860,080
[45] Jan. 14, 1975

[54] ENDLESS TRACK AND MOUNTING APPARATUS THEREFOR

[76] Inventor: Harold S. Firstenberg, 131 Townsend St., Redwood City, Calif. 94107

[22] Filed: June 21, 1973

[21] Appl. No.: 372,220

[52] U.S. Cl.................... 180/9.2 R, 305/20, 305/25
[51] Int. Cl............................................. B62d 55/04
[58] Field of Search............ 180/5 A, 9.2 A, 9.2 R; 305/25, 23, 20

[56] References Cited
UNITED STATES PATENTS

| | | | |
|---|---|---|---|
| 1,251,344 | 12/1917 | Damman | 305/23 |
| 1,437,408 | 12/1922 | Estes | 180/5 A |
| 1,631,114 | 6/1927 | Anderson | 180/5 A X |
| 1,638,329 | 8/1927 | Fennel | 305/20 |

Primary Examiner—David Schonberg
Assistant Examiner—John A. Carroll
Attorney, Agent, or Firm—Julian Caplan

[57] ABSTRACT

An endless track attachment for a wheeled vehicle for improving the traction thereof over rough and slippery terrain. The attachment cooperates with the wheel and tire of the vehicle so as to avoid the necessity for removal of the wheel upon installation of the endless track attachment. The attachment includes a rigid frame that has guides for the endless tracks. Roller members are provided on the frame for adjustably tensioning the endless members to a degree necessary to bring the endless track into frictional engagement with the periphery of the wheel, and to keep the track from coming off the frame.

7 Claims, 4 Drawing Figures

PATENTED JAN 14 1975

ENDLESS TRACK AND MOUNTING APPARATUS THEREFOR

This invention relates to an endless track structure for enhancing traction of a wheeled vehicle and a mounting apparatus for quickly installing the apparatus on the vehicle and removing the apparatus from the vehicle.

The present invention adapts conventional motor vehicles such as trucks, automobiles, tractors and the like, for travel over rough and unstable terrain by provision of endless tracks and apparatus for mounting the endless tracks on two or more wheels of the vehicle. Further, the invention can be used with dual wheels and with dual axles by modifications which will be readily apparent to those skilled in the art. One prior art attempt at solving the problem solved by the present invention includes a track and supporting structure therefore that can be installed in place of a vehicle wheel. Although such prior art device is operable, the utilization of it is somewhat inconvenient in that the wheel and tire must be removed and stored when the track laying attachment is installed on the vehicle, and the supporting structure and carrying device must be massive enough to support the vehicle weight, thus limiting its use to light four-wheel drive vehicles, such as pick-up trucks, utility vehicles and station wagons. Heavier vehicles, such as trucks of over one-ton capacity, are not readily adapted to such devices, nor are vehicles not having four-wheel drive. By way of contrast, the present invention employs the vehicle wheel to drive and support the endless track whereby the problems of wheel storage and weight support are eliminated, the unit may be used with four-wheel drive on dual and double axle dual trucks, and the endless track apparatus herein proposed is much less complex.

According to the present invention there is a frame that is adapted to be mounted on the axle of a vehicle without removing the wheel and tire from the vehicle. The frame supports a plurality of sheaves or pulleys on which are trained endless members such as V-belts. The V-belts on their exterior surfaces have a plurality of transverse cleats. The endless members are, at the outset, very loose thereby to simplify installation of the structure on to a vehicle wheel. The invention provides mechanisms for tensioning the endless members after the frame is installed on the vehicle wheel so that the endless members are taut and so that the cleats engage the terrain at the bottom of the wheel and engage the tire itself along a length sufficient to transmit force from the tire to the track. The tensioning machanisms act to draw the endless members inward toward the tire periphery so as to avoid contact between the track and the body of the vehicle during travel of the vehicle over irregular terrain.

An object of the invention is to provide a traction enhancing track mechanism for a wheeled vehicle that can be installed without removing the wheel. Achievement of this object provides a mechanism that is relatively light in weight and uncomplex because it uses the wheel as a force transmitting element.

Another object of the invention is to provide a track mechanism that can be installed on wheels of different sizes. Attainment of this object is made possible because the endless track that constitutes a part of the invention is of sufficient length that it can be installed in a slack condition; the invention includes a mechanism that tensions the track only to a degree sufficient to draw the track into frictional contact with a portion of the periphery of the wheel.

The foregoing, together with other objects, features and advantages of the present invention, will be more apparent after referring to the following specification and accompanying drawing in which.

Figure 1:
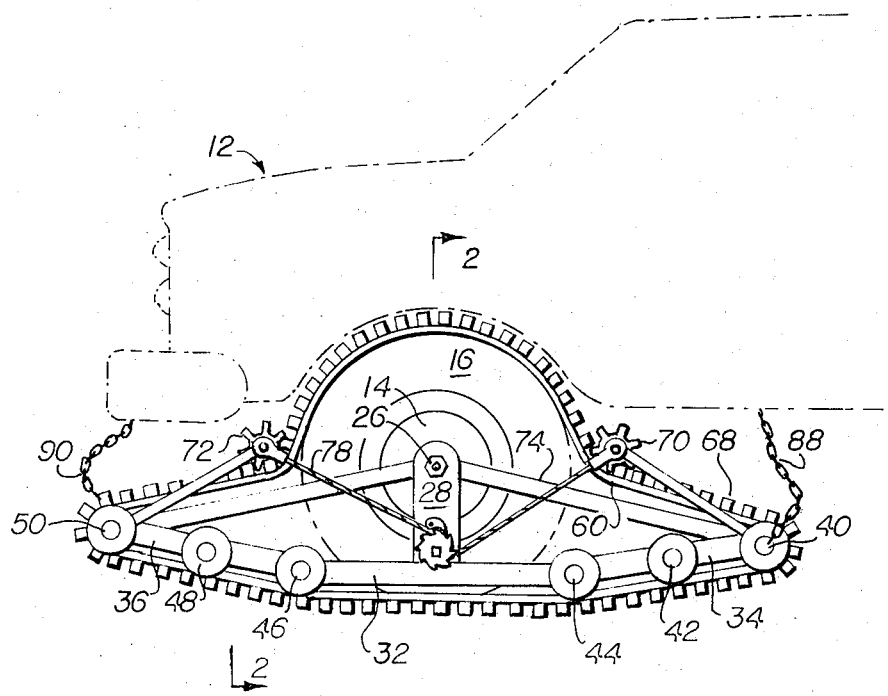
FIG. 1 is a side view of a fragment of a vehicle on which the present invention is installed.

Referring more particularly to the drawing, reference numeral 12 indicates a vehicle on which is mounted a wheel 14 that carries a pneumatic tire 16 of conventional form. Wheel 14 is shown in the drawings as a rear wheel, but it may be a front wheel and the device may be adapted to two- or four-wheel drives. Wheel 14 is supported on an axle 18 which includes a drive shaft 19 from a differential, not shown. As is conventional, wheel 14 is mounted to a hub attached to shaft 19 by means of stud bolts 20, which are accessible from the exterior of the vehicle for removal of wheel 14 and tire 16.

Figure 4:
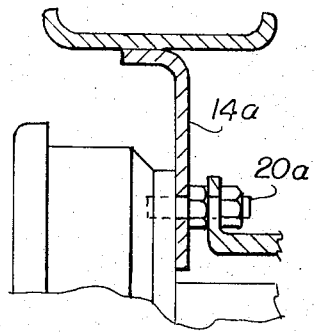
FIG. 4 is a fragmentary sectional view of a modification.

According to the present invention, there is a bearing cage assembly 22 that includes at the inner extremity thereof a circular flange 24 that has holes corresponding to the size and location of stud bolts 20 so that the bearing cage is retained on the wheel by employment of the stud bolts. In the modification of FIG. 4, stud bolts 20a have double ends with a head there-between. The bolts 20a retain the wheel 14a in place and permit cage 22 and other mechanism to be removed without removing the wheel. Bearing cage 22 includes a shaft 26 that is concentric with axle 18 and shaft 19 and extends outward of the wheel. Mounted for rotation relative shaft 26 is an arm 28, there being suitable bearings 30 between arm 28 and shaft 26 so that the wheel can rotate without rotating the arm. Arm 28 is a part of the rigid support frame for the track and includes a tangentially extending member 32 (see FIG. 1) a forward extending member 34 and a rearward extending member 36, all of which are rigid with one another and with arm 28.

On the inner side of wheel 14 is a similar arm 28 which includes tangential, forward and rearward members corresponding to such members associated with arm 28. Arm 28 is mounted to axle 18 by a split cap rotating joint 38 which supports arm 28 rigidly and does not interfere with rotation off the wheel, because drive shaft 19 which supplies power to the wheel is housed within axle 18. Joint 38 is movable and preferably contains a bearing or ball joint.

Figure 2:
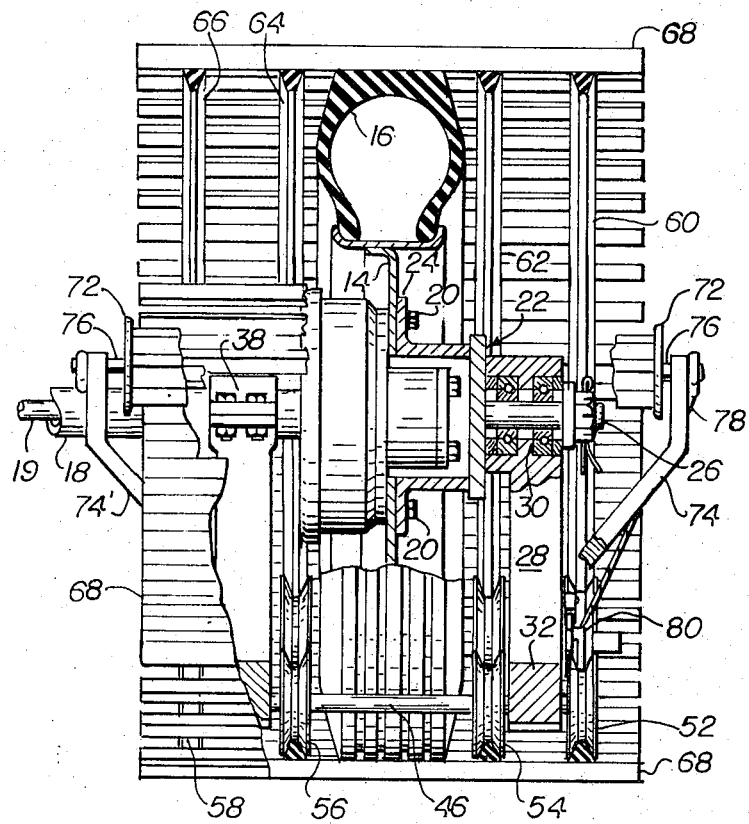
FIG. 2 is a cross-sectional view taken generally along line 2—2 of FIG. 1, with portions being broken away to reveal certain details.

Journaled for rotation on forward extending arm 34 and its counterpart mounted on arm 28 are cross shafts 40 and 42; mounted on the extremities of tangential arm 32 are cross shafts 44 and 46; and journaled for rotation with respect to rearward extending arm 36 are cross shafts 48 and 50. Mounted on each shaft 40 – 50 are a plurality of sheaves, those sheaves mounted on shaft 46 and shown in FIG. 2 being typical. There is a pair of outer sheaves 52 and 54 and a pair of identical inner sheaves 56 and 58. Trained around sheaves 52 –

58 and their counterparts on the other shafts are endless members, such as V-belts 60, 62, 64 and 66. The sheaves guide the respective endless members for movement along paths that reside in planes that are normal to axle 18, each path including a lower run, which is approximately tangent to the periphery of tire 16, and upper forward and rearward runs which extend from the sheaves on shafts 40 and 50, respectively, to the periphery of tire 16 at the upper region thereof. Fastened to the exterior surface of the V-belts is a plurality of substantially identical terrain engaging cleats 68.

For tensioning the belts 60 – 66 and for drawing cleats 68 into contact with tire 16, there is a forward splined roller 70 and a similar rear roller 72. The size of and the space between the splines on rollers 70 and 72 is such as to engage and support cleats 68; in one structure designed according to the invention, cleats 68 are one inch square members mounted on the V-belts on two inch centers and the splines on rollers 70, 72 are sized and shaped accordingly. Because the rollers and the structure that supports them are identical, only one will be described in detail. Pivotally mounted on rearward extending frame member 36 is an arm 74; an identical arm 74 is pivotally mounted on the inner frame member of which arm 28 is a part. The outer end of arm 74 rotatably supports a shaft 76 on which roller 72 is mounted. The opposite end of shaft 76 is similarly supported by the outer end of arm 74'. Secured to the outer ends of arm 74 and 74' are one end of a tension member such as steel cables 78. The inner ends of cables 78 are secured to a spool 80 which is mounted for rotation on arm 28. Concentric with the axis of rotation of the spool and rigid with the spool is a non-circular projection 82 which affords a grip on the spool by a wrench or like torque applying instrumentality. Also, rigid with spool 80 are ratchet teeth 84 which cooperate with a pawl 86 that is pivoted on arm 28. Ratchet teeth 84 and pawl 86 cooperate to permit cable 78 to be tensioned by application of torque to non-circular member 82 and to retain such tension until pawl 86 is intentionally disengaged. As is clear from FIG. 1, tension on cables 78 causes arms 74 to pivot inward in consequence of which rollers 70 and 72 draw the runs of the track between the periphery of tire 16 and the sheaves on shafts 40 and 50 inward so as to tension the track and retain cleats 68 in frictional engagement with the periphery of tire 16. This arrangement also profiles the path of the track to allow maximum body and fender clearance.

Figure 3:
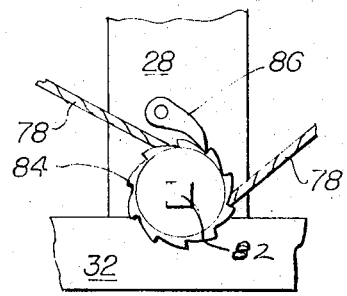
FIG. 3 is an enlarged fragmentary view of the portion of the structure of FIG. 1.

The operation of the present invention is as follows:

Cables 78 are loosened by disengagement of pawl 86 from ratchet teeth 84 so that rollers 70 and 72 can be moved to a position at which endless members 52 – 58 are loose. Stud bolts 20 are removed and bearing cage 22 is installed with the holes in flange 24 aligned with the stud bolts. The stud bolts are then reinstalled and tightened. Split cap joint 38 is also tightened to mount arm 28 and the frame members associated therewith to axle 18. This structure is required, ordinarily, to support the heavy weight and is adaptable to the rear wheels. For the front wheels, a suitable structure will readily occur to one skilled in the art. The frame is thus securely mounted but V-belts 52 – 58 are loose. Because the V-belts are loose, they do not inhibit or otherwise interfere with installation of the device. Next, the spool 80 is rotated in a counter-clockwise direction as viewed in FIG. 3 by engagement of non-circular projection 82 with a suitable tool so that cables 78 are tensioned thereby moving rollers 70 and 72 inward and tensioning V-belts 52 – 58. This causes cleats 68 to engage the surface of tire 16 and assures that the V-belts are positioned within the sheaves. When power is supplied to tire 16 through shaft 19, the tire rotates and drives the endless track in an appropriate direction, thereby improving the traction on the terrain over which the vehicle travels. When it is desired to remove the apparatus, such as would be the case when the vehicle is to travel on paved surfaces, pawl 86 is disengaged from ratchet teeth 84 so that arms 74 can pivot outward the release the tension applied to the endless track by rollers 70 and 72. Stud bolts 20 and split cap joint 38 can then be removed and the entire structure can be removed from the vehicle whereby the vehicle can operate normally.

For further supporting the frame composed by arms 32, 34 and 36 against severe forces, there is a forward loose chain 88 and a rearward loose chain 90. The chains have one end attached to the suitable portions of the vehicle frame. Such chains afford additional stability to the endless track supporting frame which may well be desirable on extremely rugged terrain. The chains, by employment of suitable hardware not shown, do not materially impede the ease with which the structure can be installed onto or removed from a vehicle. Chains 88, 90 are loose enough not to restrict or prevent movement of frame 32 – 34 – 36, but they do prevent engagement of the device with the vehicle.

Thus it will be seen that the present invention provides a track laying apparatus for installation on a wheeled vehicle for improving the traction between the vehicle tires and the ground surface. Because the apparatus employs as an essential part the vehicle wheel and tire, the apparatus is lighter in weight, less complex, and more convenient to install because it eliminates the necessity for removing the wheels and providing storage for them.

Although one embodiment off the invention has been shown and described, it will be obvious that other adaptations and modifications can be made without departing from the true spirit and scope of the invention.

What is claimed is:

1. Track laying apparatus for a vehicle having at least two wheels supported on an axle comprising a rigid frame member, each said wheel having a hub having stud bolts, first means for removably mounting said frame member on the axle for rotation relative to the wheel so that the frame does not rotate with the wheel, said frame member having generally horizontal portions extending forward and rearward of the wheel, a front sheave journaled on said forward portion and a rear sheave journaled on said rearward portion, an endless flexible member trained around said sheaves and the wheel, said endless member having a first run between said sheaves that is approximately tangent to the periphery of the wheel at the terrain engaging region thereof and a second run between one of said sheaves and a region of the periphery of the wheel remote from the terrain engaging region, means engaging said second run for urging the endless member inward so as to tension the endless member, means for adjusting said urging means, and a plurality of cleats mounted to said endless member and engaged by the wheel in said first run, said cleats being adapted to provide traction on the surface on which the vehicle travels, said first means comprising a flange apertured to be attached to said hub by said stud bolts, a bearing cage assembly fixed to said flange and extending axially outward from said flange, bearings mounted on said bearing cage assembly coaxial with said axle, said frame member having an arm apertured to fit over said bearings.

2. Apparatus according to claim 1 wherein said adjusting means comprises a spool mounted on said frame member for rotation about the central axis thereof in a first direction and a second direction opposite the first direction, a flexible tension member having a first end secured to said spool and a second end secured to said urging means, means for rotatively driving said spool in the first direction to wind the flexible chain-like member thereon, and means for inhibiting rotation of said spool in the second direction.

3. Apparatus according to claim 2 wherein said urging means includes a splined roller for engaging the exterior of said cleats in said second run, an arm having a first end supporting said roller and a second end pivotally mounted on said frame, and means for attaching said second end of said flexible chain-like member to the first end of said arm.

4. Apparatus according to claim 2 wherein said spool rotation inhibiting means comprises a series of ratchet teeth mounted rigid with said spool, a pawl engageable with said ratchet teeth, and means for pivotally mounting said pawl on said frame so that it can be moved into and out of engagement with said ratchet teeth respectively to inhibit and permit rotation of said spool in the second direction.

5. Track laying apparatus for a vehicle having at least two wheels supported on an axle comprising substantially identical inner and outer support frames, each said support frame including an arm having an upper end and a lower end and a horizontal member rigid with the lower end of the arm, the horizontal member of each said frame having a forward extending portion and a rearward extending portion that extend from said arm by an amount in excess of the radius of the wheel, means for mounting the upper ends of said arms on said axle so that the horizontal members of the respective frames are approximately tangent to the terrain engaging region of the periphery of the wheel, said inner frame being mounted on the inner side of the wheel and said outer frame being mounted on the outer side of the wheel, each said forward extending frame portion having at least one guiding means thereon and each said rearward extending frame portion having at least one guiding means thereon in respective longitudinal alignment with the guiding means on the forward extending frame portions, said guide members defining in conjunction with the wheel inner and outer paths each having a lower run between said forward and rearward guide members, an upper forward run between the forward guide and the upper extremity of the periphery of the wheel, and upper rearward run between the rearward guide and the upper extremity of the periphery of the wheel, inner and outer endless members trained around said guide members and the upper extremity of the periphery of the wheel, said endless members having a length greater than said paths so that said endless members are slack so as to permit installation of said apparatus onto a wheel, a plurality of cleats joined to said endless members and spanning the space therebetween, and means engageable with one of said upper runs for tensioning said endless members to retain them in engagement with said guides and a portion of said wheel.

6. Apparatus according to claim 5 wherein said endless member tensioning means comprises a roller having length corresponding to the length of said cleats, inner and outer pivot arms having first ends rotatively supporting the ends of said roller and second ends pivotally mounted on respective said frames so that said roller is movable between an outer position in noncontacting relation to said cleats in one of said upper runs and an inner position contacting said cleats to deflect said endless membrs from last said run, and means for retaining said roller in said second position.

7. Apparatus according to claim 6 wherein said roller retaining means comprises inner and outer flexible chain-like means having first ends connected to respective first ends of said pivot arms and second ends remote from said first ends, inner and outer spools secured to respective said second ends, means for supporting said spools for rotation on respective said support frames, means for rotatively driving said spools to wind said flexible chain-like members on respective said spools so as to move said pivot arms toward said inner position, and means for releasably inhibiting rotation of said spools.

* * * * *